United States Patent [19]

Eibach et al.

[11] Patent Number: 4,631,661
[45] Date of Patent: Dec. 23, 1986

[54] FAIL-SAFE DATA PROCESSING SYSTEM

[75] Inventors: Wolfgang Eibach, Holzgerlingen; Kuno M. Roehr, Boeblingen; Klaus M. Schulz, Aidlingen, all of Fed. Rep. of Germany

[73] Assignee: International Business Machines Corporation, Armonk, N.Y.

[21] Appl. No.: 850,425

[22] Filed: Mar. 19, 1986

Related U.S. Application Data

[63] Continuation of Ser. No. 545,285, Oct. 25, 1983, abandoned.

[30] Foreign Application Priority Data

Dec. 7, 1982 [EP] European Pat. Off. ........ 82111312.3

[51] Int. Cl.⁴ .................................... G06F 11/16
[52] U.S. Cl. ................................................. 364/200
[58] Field of Search ............ 364/200 MS File; 371/9, 371/11, 14

[56] References Cited

U.S. PATENT DOCUMENTS

| | | | |
|---|---|---|---|
| 3,303,474 | 2/1967 | Moore et al. | 364/200 |
| 3,636,331 | 1/1982 | Amrehn | 364/187 |
| 3,641,505 | 2/1972 | Artz et al. | 340/172.5 |
| 3,810,119 | 5/1974 | Zieve et al. | 364/200 |
| 3,818,199 | 6/1974 | Grossman et al. | 253/153 AK |
| 3,864,670 | 2/1975 | Inoue et al. | 340/172.5 |
| 3,964,056 | 6/1976 | Charpentier et al. | 340/172.5 |
| 4,208,715 | 6/1980 | Kumahara et al. | 364/200 |
| 4,228,496 | 10/1980 | Katzman et al. | 364/200 |
| 4,442,502 | 4/1984 | Friend et al. | 371/9 X |

FOREIGN PATENT DOCUMENTS 2460259 1/1976 Fed. Rep. of Germany .
2727983 11/1979 Fed. Rep. of Germany .

Primary Examiner—Raulfe B. Zache
Attorney, Agent, or Firm—Curtis G. Rose; J. Bouchard; M. H. Klitzman

[57] ABSTRACT

A fail-safe multiprocessor system comprises processors connected through a switching unit which forms a data transfer channel between the processors. This switching unit comprises mechanical switches that can selectively connect peripheral units (e.g., display units) with one of the processors. The transfer device constitutes, from the standpoint of each of the connected processors, a normal peripheral unit. The switches are set either manually or automatically under program control by each of the processors. In the case of an error or failure, the data processing system is reconfigured such that the high priority tasks together with their associated peripheral units are transferred from the failed processor to a processor which is still intact.

11 Claims, 7 Drawing Figures

FAIL-SAFE DATA PROCESSING SYSTEM

This is a continuation of application Ser. No. 545,285, filed Oct. 25, 1983, now abandoned.

TECHNICAL FIELD

The invention relates to a fail-safe data processing system.

BACKGROUND OF THE INVENTION

Data processing systems are increasingly being used for applications whose operating cycle must not be interrupted. Examples of such applications are the control of industrial processes, the monitoring of space missions or the handling of banking transactions. Maintenance work or defects in such systems should only reduce their performance temporarily, not lead to a complete standstill of the job at hand.

For this purpose, such applications are typically carried out by systems with built-in redundancy where the components that are still intact take over the work of those that have failed. The necessary switching (i.e., reconfiguration) is accomplished by the systems themselves as soon as an error condition is detected.

Redundant systems are described, for example, in the article "Development of On-Board Space Computer Systems" by A. E. Cooper and W. T. Chow in the IBM Journal of Research and Development, January 1976, and in the German Offenlegungsschrift No. 2,108,836.

The expense involved in the design and manufacture of such redundant systems is substantial, as generally both the circuits (i.e., the hardware) and the control programs (i.e., the operating systems) have to be suitably adapted. This expense is often intolerable for many applications.

DISCLOSURE OF THE INVENTION

It is the object of the present invention to provide a fail-safe data processing system that can be realized by means of existing computers, without interfering with their hardware, and which necessitates only slight changes in the existing operating systems.

An essential feature of the present invention concerns the switching of peripheral units (e.g., display units or printers) in a multi-processor system where one processor is capable of assuming the tasks of another (failed) processor. Because modern computer systems for on-line applications may be connected to a very large number of display units and because frequently only some of the display units connected to a failed processor have to be switched, it is essential to have selective, simple and inexpensive switching means to prevent the other processor (which has to administer its own display units) from being overloaded. The invention provides, therefore, for a switching unit which comprises a mechanical switch that is set under control of the operating program for each connected peripheral unit. The switching unit, like any other peripheral unit, is connected to each of the processors and thus is addressed and receives instructions without interfering with the hardware control of the processors.

Since the two processors are connected to the switching unit through separate terminals (ports), they are capable of communicating with each other. Thus, without interfering with the computer hardware, a multiprocessor system is obtained by connecting two conventional computers to the switching unit. The necessary control is effected by means of operating programs.

To switch the remaining computer components (e.g., the channels and the disk storages), the facilities (i.e., channel switches or string switches) existing in modern systems are used. Disk storages are rendered fail-safe by configuring them in pairs and by duplicating the information content of one disk storage in the (other) associated ("mirrored") disk storage.

The proposed multiprocessor system permits providing a fail-safe data processing system with a plurality of peripheral units and a minimal number of additional circuits. The switching unit used in this system can be directly controlled by the operating program without interfering with the existing systems and is highly flexible and reliable despite its simple design.

BEST MODE FOR CARRYING OUT THE INVENTION

Figure 1:
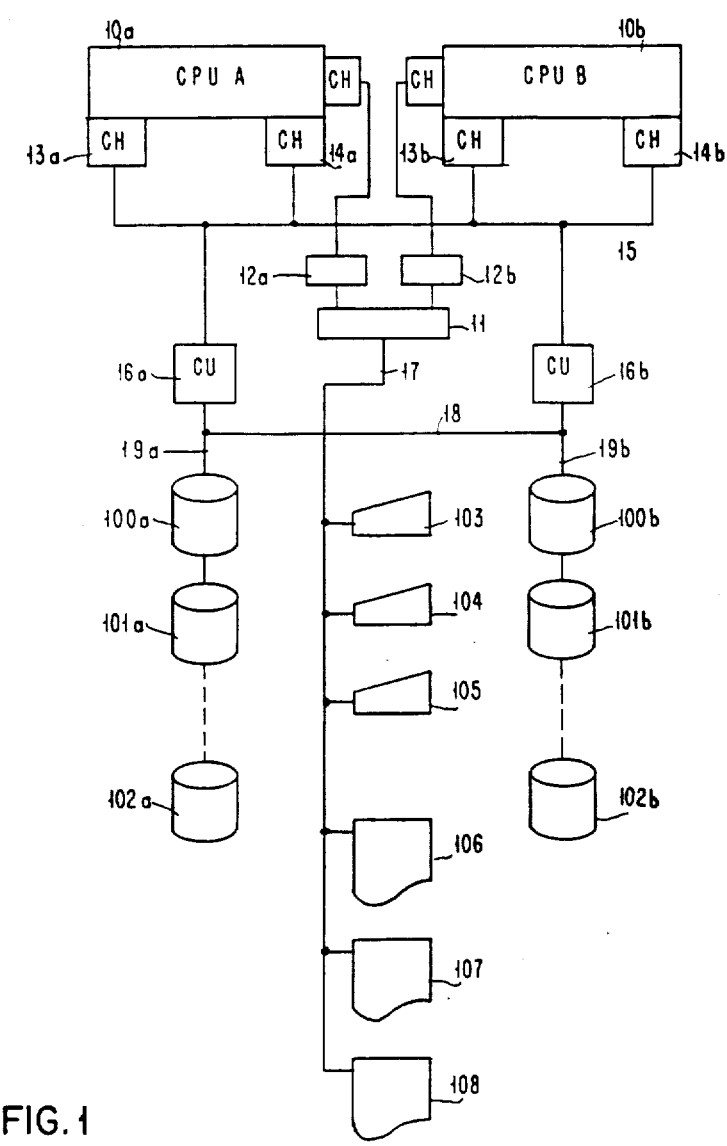
FIG. 1 is a schematic representation of the design of a duplex processor with switchable peripheral units.

FIG. 1 shows a duplex system, consisting of the processors CPU A and CPU B (10a and 10b, respectively) as an example of a fail-safe, coupled multiprocessor system. In the subsequent description, identical components associated with one of the two processors are distinguished by indices a, b. In all figures, identical components bear the same reference numerals. The disk storage (100–102) of each processor are connected through channels (CH) 13, 14, buses 15, control units (CU) 16, and further buses 19. The channels 13, 14 of the processors are interconnected by a channel switch (not shown) such that bus 15 can be selectively connected to each channel. Similarly, buses 19 from the control units 16 are interconnected by string switches (with bus 18) such that each "string" of disk storages 100 to 102 can be controlled by each of the control units 16.

Additional peripheral units of the two processors, for example, the display units 103 to 105 or the printers 106 to 108 are linked through individual coaxial cables 17 with the individual terminals of a switching unit 11 which in turn is connected to a channel (CH) of the processors 10a, 10b through adapter circuits 12a, 12b. The setting of the individual switch of the switching unit 11 determines the respective processor with which the peripheral unit is associated at a particular time.

The channel and string switching of the duplex system according to FIG. 1 and the switching unit 11 allow each peripheral unit to be selectively associated with each of the processors, so that the computer system may be reconfigured in the case of an error or if the system is to be disconnected for maintenance purposes.

In another embodiment of the duplex system according to FIG. 1, the switching unit 11 may also be directly connected to the processors without using channels. In this case, the string switching means and the switching unit 11 are used only for reconfiguration.

In lieu of the individual disk storages 100 to 102, schematically represented in FIG. 1, double disk storages may be provided which receive exactly the same information. For this purpose, each write instruction issued by a program is duplicated under control of the operating system and used in parallel for the two coupled disk storages. In addition to improved availability, this arrangement has the further advantage that the access time for read operations is reduced because the read/write heads in the two disk storages may be positioned independently of each other. The two "mirrored" disk storages may be connected in different strings, to further improve the reliability.

Figure 2:
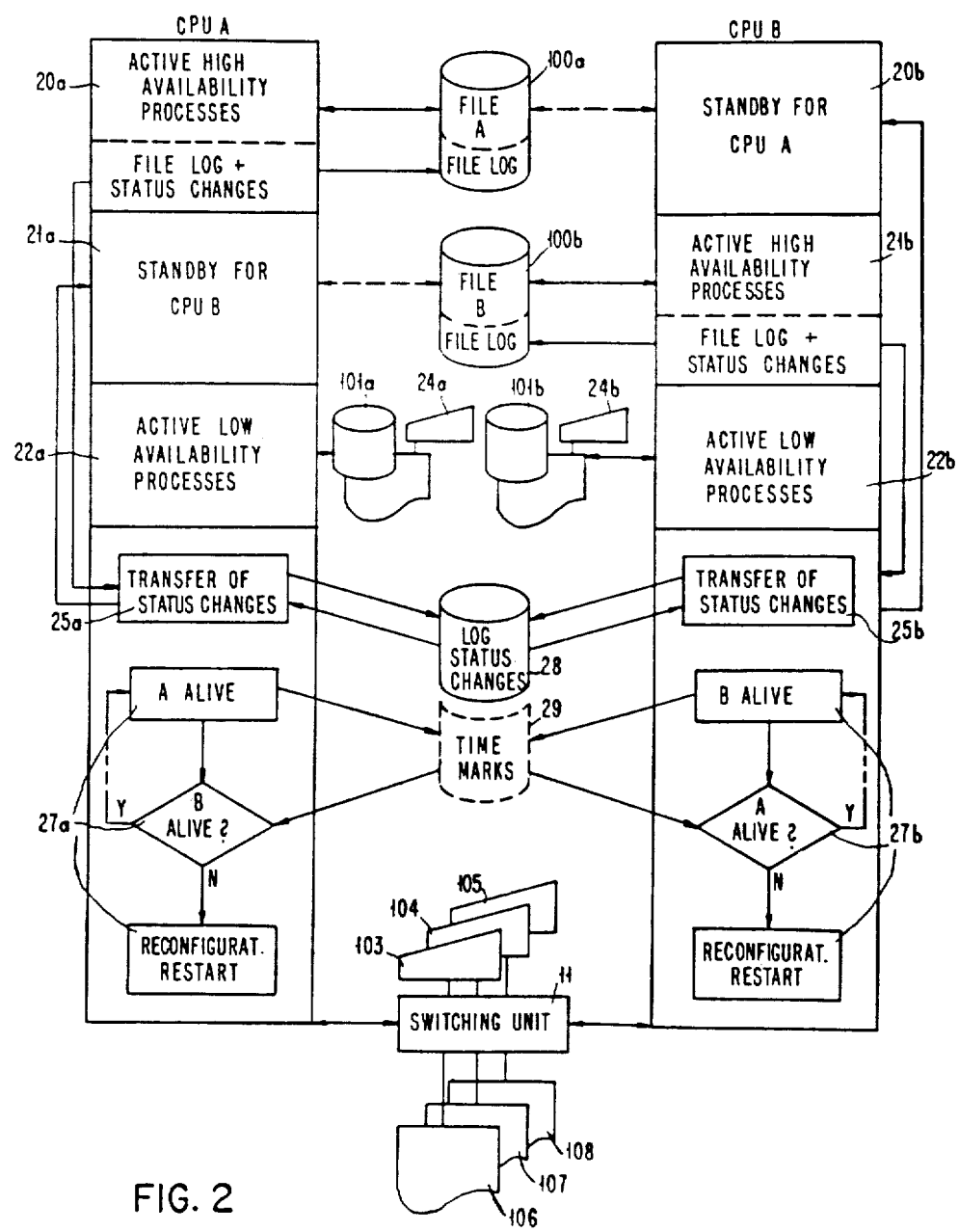
FIG. 2 is a schematic representation of the processes performed in the two processors of FIG. 1.

FIG. 2 shows a schematic example of how work is distributed to the two processors CPU A, CPU B of the duplex system according to FIG. 1. Application programs 20a, 21b, which must not be interrupted, are run in both processors. For this purpose, the respective other system is provided with inactive standby programs 20b, 21a which are capable of resuming the work being handled from the point where the interruption occurred if the other system fails. Before starting the standby program, restart routines are performed to restore a well-defined system status (e.g., of the files used). The data handled are stored in files and data banks in disk storages 100a and 100b, respectively, which may also be accessed by the standby program after the connections have been reconfigured, as explained above in connection with FIG. 1.

The respective state of the main programs is communicated to the standby programs by providing each processor with communication means (e.g., programs) 25a and 25b, respectively, to which the state of the active program (e.g., 20a) and the files is transmitted and fed through a file in a disk unit 28 to the other processor. Disk unit 28 stores the changes that have occurred. In the absence of such communication means, the standby program restores the status of the failed processor before resuming the work being handled.

In addition to high availability applications and the standby program for the respective other processor, each of the processors is suitable for further applications, 22a, 22b which are less adversely affected by interruptions. These applications may be associated with peripheral units (e.g., disk storage 101, printer 23 and display units 24) which are not switched in the case of an interruption. Applications 22a and 22b may be interrupted, for example, if one of the processors is to take over the high availability applications of the other processor and requires additional capacity for this purpose.

The operating systems of both processors CPU A, CPU B comprise monitoring means 27a, 27b which continuously monitor the state of their own or the other processor. During normal operation, each of these monitoring means emits vital signs (time marks), sensed at regular intervals by the respective other monitoring means, to a disk storage 29. In the absence of these vital signs, the reconfiguration of the entire system, which may be required in individual cases, is initiated by the processor that is still intact. For this purpose, instructions are issued to the switching unit 11 and the channel switching or string switching units.

Figure 3:
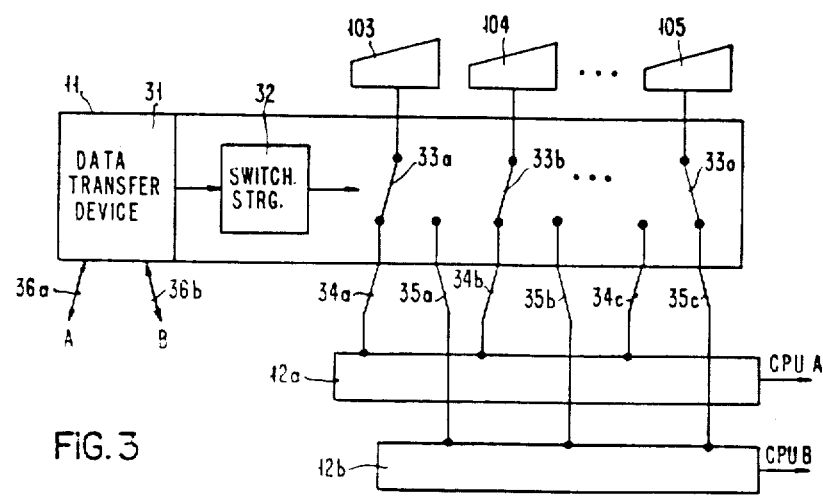
FIG. 3 is a schematic of the design of a switching unit for peripheral units.

FIG. 3 shows the typical design of the switching unit 11 for the peripheral units, such as display units and printers. For each of the connectable units 103 to 105, a mechanical, e.g., double-pole, switch 33a to 33c is provided which may be set manually or by a switch control 32. The switch control 32 in turn receives instructions through data transfer device 31 which is connected to the two processors CPU A and CPU B by means of lines 36a, 36b. Along the same path, switch control 32 supplies information on the respective setting of each switch to processors CPU A and CPU B.

The two outputs of switches 33 are connected through coaxial cables 34 or 35 to concentrators 12a or 12b which link each of the coaxial cables with processor CPU A or CPU B (e.g., on the time multiplex principle). For each of the mechanical switches 33, the front face of the switching unit 11 is provided with buttons for manual operation as well as indicator lamps for the respective switch setting.

By means of the switching unit 11, each of the connected peripheral units 103 to 105 can be selectively associated with one of the two processors CPU A or CPU B. The association of a particular peripheral unit with a particular application program can be effected either manually by the operator or under program control. In the case of an error, peripheral units which are associated with non-interruptable applications may be switched from the failed processor to another processor. For this purpose, it may be necessary to switch off those peripheral units of the intact processor to which low priority work has been assigned, in order to prevent overloading. Switching off is effected automatically such that a unit which is no longer active has its switch connected to the failed processor.

Switches 33 are preferably designed as double-pole self-latching magnetic relays so that the core and shield of the coaxial cable 34, 35 can be simultaneously switched. Such relays require no energy for maintaining their respective setting. A relay suitable for such applications is manufactured by Teledyne under the designation 420/22.

Figure 4:
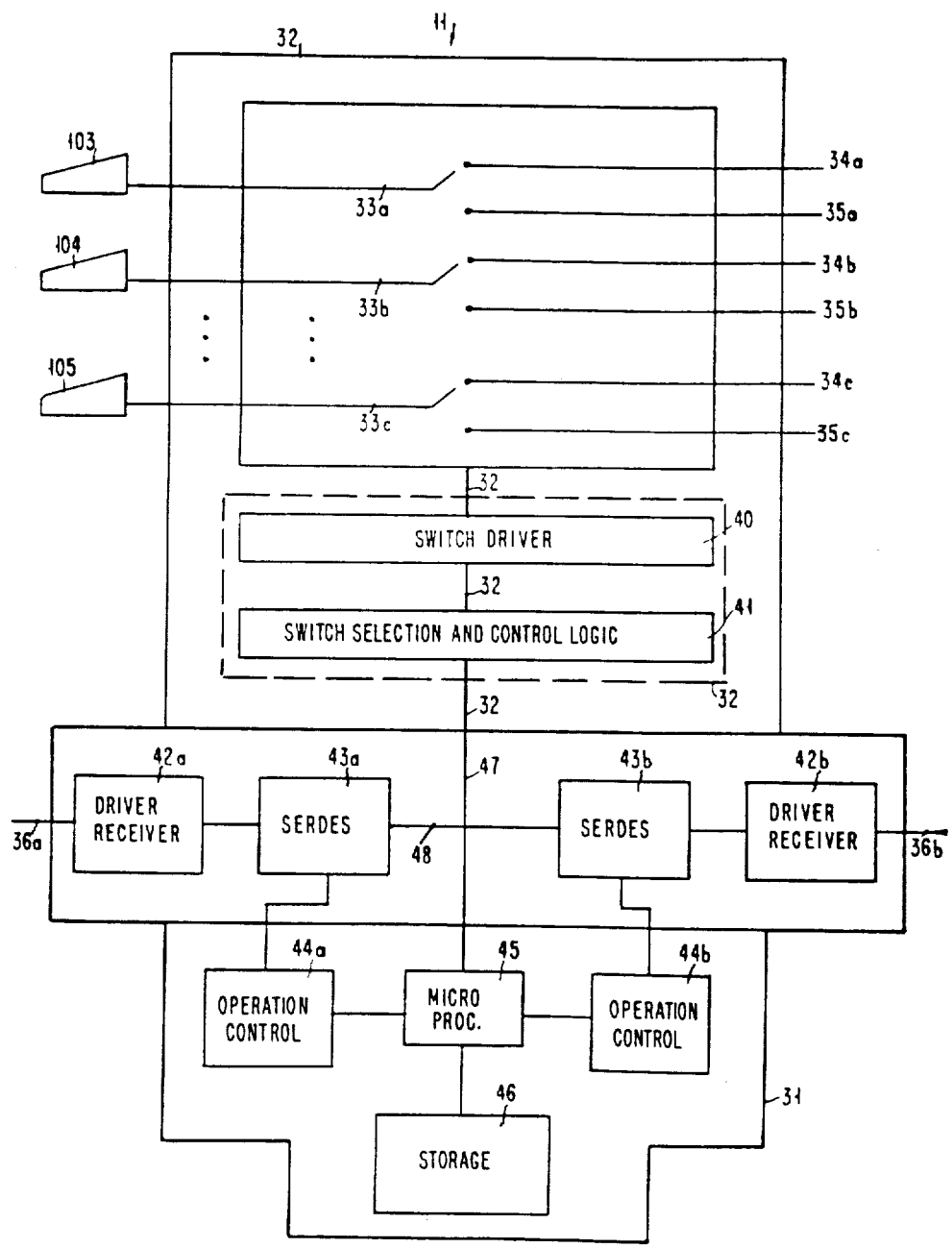
FIG. 4 is a detailed block diagram of the switching unit of FIG. 3.

FIG. 4 is a block diagram showing details of the data transfer device 31 and the switch control 32 in the switching unit 11. Switches 33a to 33c are actuated by drivers 40 which in turn are actuated by selection and control logic 41. The control logic 41 receives instructions from a microprocessor 45 with a connected storage 46. The programs to be run in the microprocessor 45 are initiated by an operation control 44a and 44b which is controlled by instructions issued by the processors CPU A and CPU B through lines 36a, 36b, line drivers 42a, 42b and serialization/deserialization circuits (SERDES) 43a and 43b. Lines 36a, 36b are coaxial lines, such as those used to connect other peripheral units to the processors. By suitably programming the microprocessor 45 and the operation controls 44, the switching unit 11 is addressed by the processors like a normal peripheral unit if instructions for setting selected switches are to be issued to it. Thus, the driver/receiver circuits 42a, 42b are designed in a manner known from other peripheral units. They comprise, for example, means for restoring pulse shapes which were changed during transfer, clock signal generators, and means for separating synchronization and data pulses.

Data transfer between one of the processors CPU A or CPU B and the switching unit 11 can be effected either by direct connections or by an intermediate control unit. In order for a processor to address the switching unit 11 the processor may, for example, emit its address which is recognized by the control unit or the switching unit 11, causing these units to receive and process the signals available on the transfer lines. As previously mentioned, use of a microprocessor in switching unit 11 allows adapting the latter to all possible transfer processes and interface conditions. The switching unit may be switched, for example, to receive data according to the so-called RS326 method.

Switching unit 11 has two terminals for the coaxial cables 36a and 36b and these are connected to each other through internal data paths (e.g., through line 48 or the microprocessor). It is also possible to exchange data between processor CPU A and processor CPU B through switching unit 11. This may be done in lieu of or in addition to the communication path by means of jointly used disk storages, for example 28 or 29. For this purpose, the processor initiating a transfer step addresses, for example, the switching unit 11 which buffers the received data (in storage unit 46). Subsequently, a corresponding signal is emitted to the second connected processor causing it to fetch or store the buffered data.

This connecting channel between the two processors CPU A and CPU B is sufficient to connect two conventional processors to form a fail-safe data processing system of the type described above.

Providing the switching unit 11 with a terminal (port) for each processor has the following advantages:

A new communication path is opened between the two processors.

Read and write operations of the two processors in storage 46 may be effected in an overlap mode.

Both processors are capable of addressing the switching unit in the same manner as other peripheral units (for exchanging data or for issuing instructions to the switching unit).

In data processing systems with more than two processors, it is possible to provide more than two ports for the switching unit. An alternative is to link the terminals of several combined switching units with each other.

Figure 5:
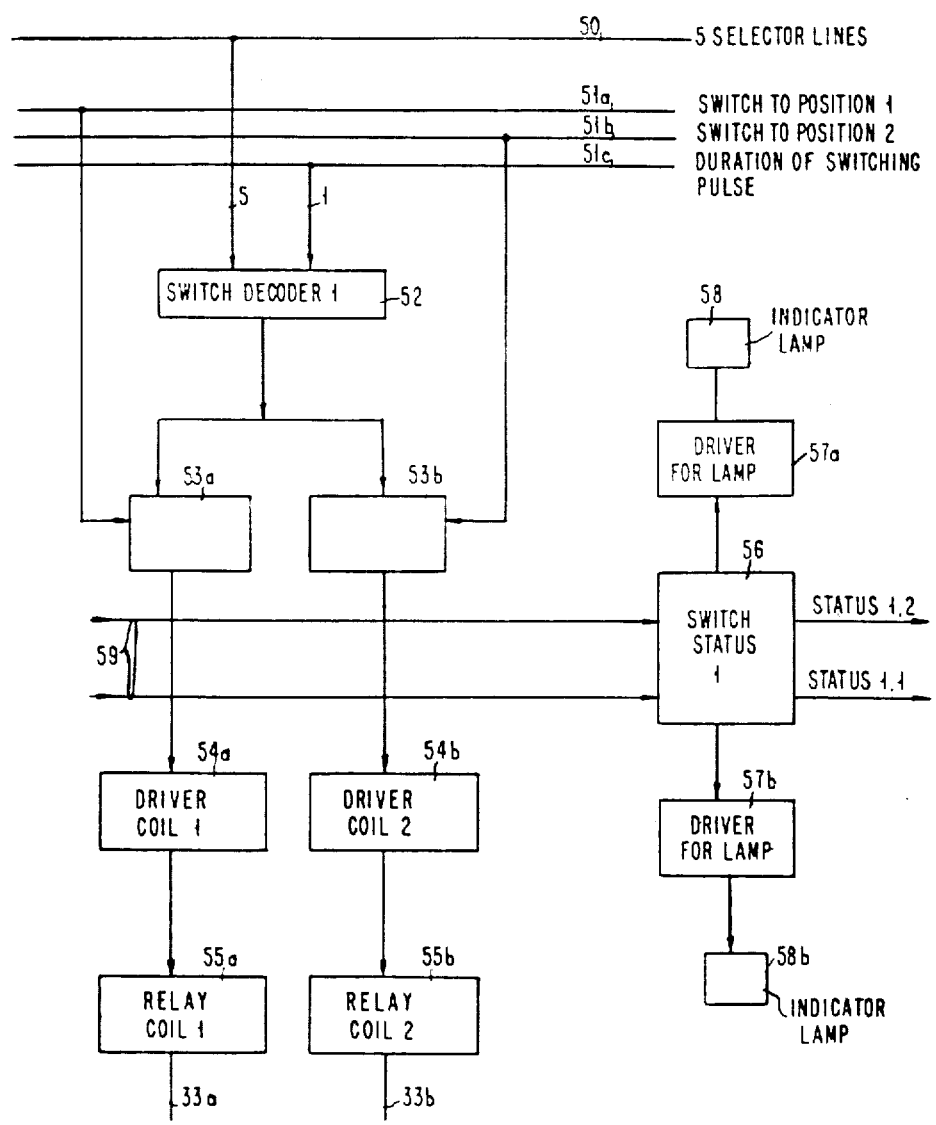
FIG. 5 shows the control circuits for the mechanical switches of the switchhing unit of FIGS. 3 and 4.

FIG. 5 shows details of the switch selection and control logic 41 in FIG. 4. The coded selection signals for changing the setting of one of the 32 switches are applied to a group of five selector lines 50 and fed to all 32 switch decoders 52. The addressed decoding circuit 52 supplies opening pulses to gate circuits 53a and 53b, the second input of which is connected to lines 51a, 51b, indicating how the switch is to be set. The length of the desired switching pulse is indicated by line 51c which is connected to the switching decoder 52. The addressed gate circuit 53a or 53b subsequently supplies a control pulse for the drivers 54a, 54b or the relay coils 55a or 55b in the switches 33a or 33b. The switch setting is sensed through lines 59 and stored in a latch circuit 56 which in turn activates one of two drivers 57a, 57b for indicator lamps 58a and 58b, respectively. The switch setting is also sensed by microprocessor 45 (see FIG. 4) through lines 59a to be communicated to the two connected processors (e.g., after manual actuation of the switches).

As long as switch unit 11 changes switch settings at the request of one processor, it cannot be addressed by the other processor, so that there are no undefined states. Changed switch settings are also communicated to the processor which has not requested the change.

Figure 6A:
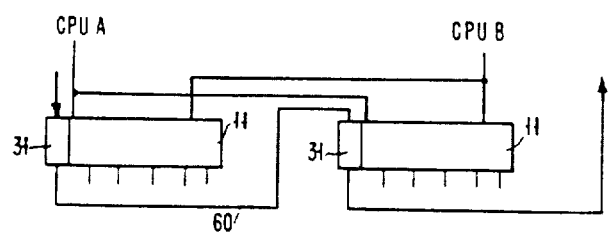
FIGS. 6A and 6B are examples of switching units of FIG. 4, connected in parallel and in series.

If the number of peripheral units to be connected exceeds the number of switches existing in switching unit 11, several such units 11 may be connected in parallel according to FIG. 6A. As a result, data transfer devices 31 in the switch units 11 are series-connected through line 60 and thus may also be addressed by the two processors.

Figure 6B:
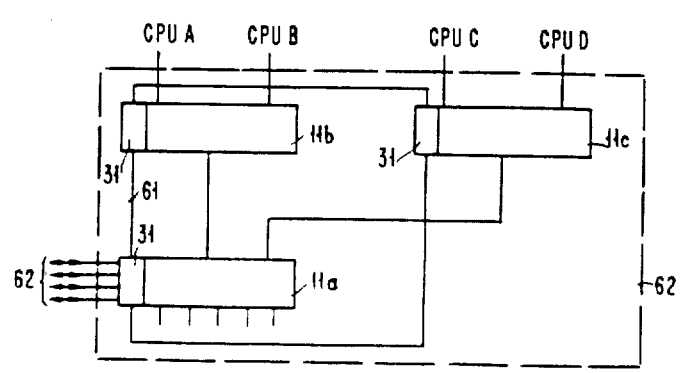

In systems with more than two processors, switch units 11 may also be series-connected, in order to allow peripheral units to be selectively connected to one of several processors CPU A, CPU B, CPU C, CPU D (See FIG. 6B). The data transfer devices of all switching units 11 combined in such an arrangement are connected in the form of a loop through a bus 61. In addition, one of the units, for example 11a, is star-connected to each of the processors through line 61 and handles the data exchange between the further switching units.

Instead of series-connecting units 11 in block 63, it is also possible to use multipole plugs receiving switching signals from a data transfer device connected to all processors.

As switching unit 11 is the principal element for coupling the two processors CPU A and CPU B, it must be highly fail-safe itself. This requirement is fulfilled by using switches which retain their setting even in the case of a power failure. The transfer means in the switching unit are best protected against power failure by an emergency battery.

While the present invention has been particularly described with reference to the preferred embodiment thereof, it will be understood by those skilled in the art that various changes in form and detail can be made therein without departing from the spirit and scope of the invention as illustrated in the appended claims.

We claim:

1. A fail-safe data processing system including:
   a plurality of processors;
   a plurality of switching units connected in series and star-connected to said plurality of processors, said plurality of switching units being addressable by each of said plurality of processors; and
   a plurality of peripheral units coupled to said plurality of switching units, said plurality of peripheral units thereby being connected to any of said plurality of processors
   whereby said fail-safe data processing system can continue operating even upon the failure of one of said plurality of processors because the peripheral units connected to the failed processor are switched to an operable processor by said plurality of switching units.

2. A fail-safe data processing system according to claim 1 wherein each of said plurality of switching units further includes a plurality of switches, said plurality of switches being actuatable by all said plurality of processors via program control.

3. A fail-safe data processing system according to claim 1 wherein each of said plurality of switching units further includes a plurality of double-pole switches, said plurality of double-pole switches being manually actuatable.

4. A fail-safe data processing system according to claim 2 wherein said plurality of switches are self-latching magnetic relays.

5. A fail-safe data processing system according to claim 3 wherein said plurality of double-pole switches are self-latching magnetic relays.

6. A fail-safe data processing system according to claim 1 wherein each of said plurality of switching units includes a data transfer device, each data transfer device being interconnected together in the form of a loop.

7. A fail-safe data processing system according to claim 6 wherein said data transfer device further includes a microprocessor.

8. A fail-safe data processing system according to claim 1 wherein each of said plurality of processors includes a plurality of channels, at least one of said plurality of channels being coupled to at least one of said plurality of switching units.

9. A fail-safe data processing system according to claim 1 further comprising a plurality of disk storages, each of said plurality of disk storages being coupled to and accessible by each of said plurality of processors.

10. A fail-safe data processing system according to claim 8 further comprising a plurality of adapter units, each coupled to at least one of said plurality of switching units, each of said plurality of processors also being connected to at least one of said plurality of adapter units.

11. A fail-safe data processing system according to claim 10 wherein a write operation to one of said plurality of disk storages is simultaneously effected in at least one other disk storage in said plurality of disk storages.

* * * * *